United States Patent
Munson et al.

(10) Patent No.: US 6,289,439 B1
(45) Date of Patent: Sep. 11, 2001

(54) METHOD, DEVICE AND MICROPROCESSOR FOR PERFORMING AN XOR CLEAR WITHOUT EXECUTING AN XOR INSTRUCTION

(75) Inventors: Kenneth Kroymann Munson, Saratoga; Peter Charles Mills, San Jose, both of CA (US)

(73) Assignee: Rise Technology, Inc., Santa Clara, CA (US)

( * ) Notice: Subject to any disclaimer, the term of this patent is extended or adjusted under 35 U.S.C. 154(b) by 0 days.

(21) Appl. No.: 09/227,787

(22) Filed: Jan. 8, 1999

(51) Int. Cl.$^7$ .................................................... G06F 15/00
(52) U.S. Cl. ........................................ 712/226; 712/223
(58) Field of Search ............................ 712/23, 208, 213, 712/223, 200, 226

(56) References Cited

U.S. PATENT DOCUMENTS

| | | | |
|---|---|---|---|
| 3,760,365 | * 9/1973 | Kurtzberg et al. | 712/216 |
| 4,594,655 | * 6/1986 | Hao et al. | 64/228.3 |
| 5,485,571 | * 1/1996 | Menon | 714/7 |
| 5,742,791 | * 4/1998 | Mahalingaiah | 711/146 |
| 5,819,064 | * 10/1998 | Razdan et al. | 395/500.48 |

FOREIGN PATENT DOCUMENTS

| | | | |
|---|---|---|---|
| 403161834 | * 2/1990 | (JP) | G06F/9/305 |
| 402043627 | * 7/1991 | (JP) | G06F/9/305 |

OTHER PUBLICATIONS

Microsoft, "Computer Dictionary, 3rd Ed.", 1997, pp. 49–50, 105, 214, 342, 367.*

Intel, "iAPX 86, 88, 186/188 User's Manual," 1985 pp. 1–5–1–7, and 1–41.*

* cited by examiner

Primary Examiner—John F. Niebling
Assistant Examiner—Stacy Whitmore
(74) Attorney, Agent, or Firm—Oblon, Spivak, McClelland, Maier & Neustadt, P.C.

(57) ABSTRACT

Improvements are made in how microprocessors execute logical exclusive OR instructions when the operands of this instruction are equal. XOR instructions with equal operands are used to clear registers and/or assign flags values without explicitly performing the actual XOR command. By setting or resetting these flags and/or clearing these registers directly, this mechanism allows these instructions to be paired with following dependent instructions simply by zeroing the dependent input of the following instructions. An architecture that hardwires the implementation into the microprocessor through logic gates is preferred. This will result in increased speed while reducing power consumption. Further, a full-sized ALU is not needed in order to execute the XOR instruction with equal operands. As this is a more direct procedure, a pipeline with a reduced capability ALU can be utilized.

51 Claims, 4 Drawing Sheets

METHOD, DEVICE AND MICROPROCESSOR FOR PERFORMING AN XOR CLEAR WITHOUT EXECUTING AN XOR INSTRUCTION

BACKGROUND OF THE INVENTION

This invention relates generally to microprocessors and their architecture for executing instructions and, more specifically, to the implementation of eXclusive OR (XOR) commands with equal operands.

As it is usually implemented, a microprocessor contains as part of its architecture a number of registers, generically called R0, R1, and so on. These commonly contain a set of general purpose registers to hold data or address quantities. An additional set of standard registers is known as the flags register. A collection of commands, the instruction set, controls the operation of the microprocessor.

The flags register consists of a number of small, usually one bit, subregisters, or flags, that control a number of conditional instructions and indicate the status of the processor. The microprocessor frequently needs to assign these flags values for conditional transfers, such as jump instructions, dependent upon the value of a certain flag. An example is the zero flag (ZF) that is set if the outcome of a particular instruction is zero. This flag is then consulted by subsequent operations if it should become important to determine if a particular operand is zero.

One of the basic members of the instruction set is the command XOR, the logical exclusive OR command. Since the logical result of XORing something with itself is 0, this device is commonly exploited as a way to clear registers. For example, the command xor r0,r0will get the content of the register R0 and XOR it with itself, producing a value of 0, which is then written back into R0, thus zeroing the register.

As a result of executing this command, the microprocessor must execute several further steps. It must note the outcome of the command and assign values to a number of flags accordingly, one of these being the zero flag that would be set to ZF=1. Thus to perform this common command and its attendant executions will require several steps, and therefore several clock cycles.

The consequences of this are particularly acute in a multiple pipeline microprocessor. Here, several commands are issued in parallel. This often results in some instructions having to wait as they may be dependent upon the outcome of another instruction. A familiar but relevant example of such a dependency, or data hazard, is the pair xor r0,r1; R0←[R0]XOR [R1]
add r0,r2; R0←[R0]ADD [R2], where the ADD instruction depends on the outcome of the XOR and must wait for it to finish in that instruction's pipeline. Hence, when one instruction is paired with following dependent instructions, several pipelines may be stalled for one or more clock cycles.

Since the result of the XOR command with equal operands is known in advance, regardless of the actual contents of the register comprising that operand, this instruction results in the redundancies listed above. As this is a frequently employed technique, the resultant consumption of time and power can become significant.

It is the primary object of the present invention to reduce these limitations by decreasing the amount of redundancy in executing XOR instructions with equal operands.

It is another object to increase speed and reduce power consumption within a microprocessor.

SUMMARY OF THE INVENTION

These and additional objects are accomplished by the various aspects of the present invention, wherein, briefly and generally, according to one such aspect, XOR instructions with equal operands are used to set/reset flags and/or clear registers without explicitly performing the actual XOR command. By assigning these flags values and/or clearing these registers directly, this mechanism allows these instructions to be paired with following dependent instructions simply by zeroing the dependent input of the following instructions.

An architecture that hardwires the implementation into the microprocessor through logic gates is preferred. This will result in increased speed while reducing power consumption.

According to another further aspect, a full-sized arithmetic logic unit (ALU) is not needed in order to execute the XOR instruction with equal operands. As this is a more direct procedure, a pipeline with a reduced capability ALU can be utilized.

DESCRIPTION OF THE PREFERRED EMBODIMENTS

Figure 1:
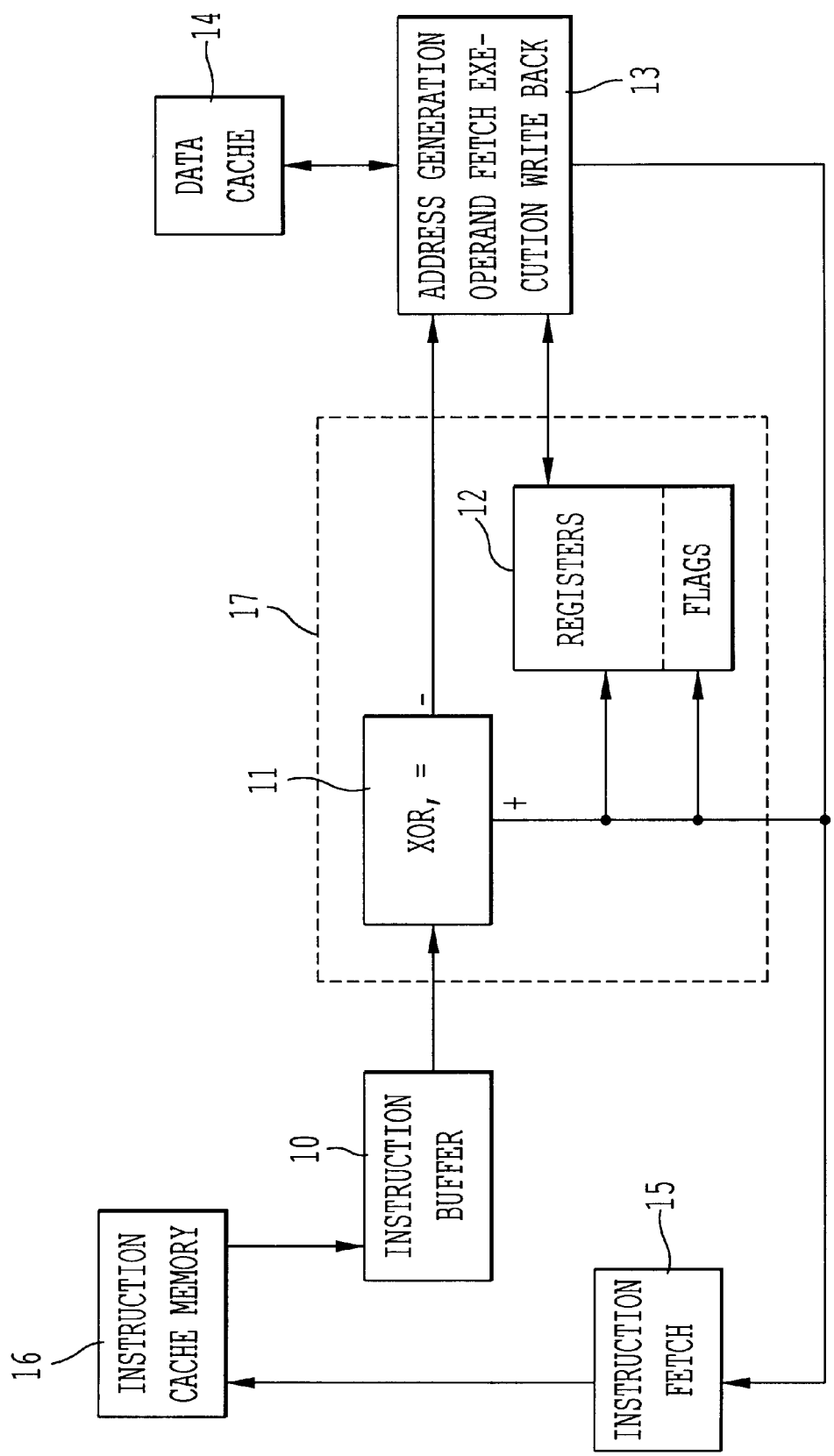
FIG. 1 is a block diagram representation of a microprocessor utilizing various aspects of the present invention.

For background, consider an eXclusive OR command (XOR) which accepts two registers for operands and how it is executed in the prior art. As discussed above, a microprocessor will contain a number of general registers generically labeled R0, R1, and so on. The contents of a register are indicated by placing the register's name in brackets, for example [R0] is the contents of R0. When the processor receives an XOR instruction, xor r0,r1; R0←[R]XOR [R1], it compares the contents of register R0bit by bit with those of register R1, with the result then written back to register R0.

The processor must then determine which flags need to set or reset as a consequence of the outcome of this instruction. For specificity, this discussion will use the familiar choice of Intel™ X86 architecture. Among the flags of interest here are:

ZF zero flag, set to 1 if all the bits of a result are zero, otherwise ZF=0;
SF sign flag, set to 1 if the result is negative, otherwise SF=0;
OF overflow flag, set to 1 if the result resulted in a signed overflow, otherwise OF=0;
PF parity flag, set to 1 if result contains an even number of is, otherwise PF=0;
CF carry flag, set to 1 if the result has generated a carry, otherwise CF=0. These flags are then all determined and set appropriately based on the result of the XOR instruction. The book by Intel, *Intel Architecture Software Developer's Manual*, 1997 gives more details and is hereby incorporated herein by this reference.

A common programming technique for clearing a particular register, say R0, and setting/resetting flags is to issue the command xor r0,r0, sometimes referred to as (XOR,=) below. Since the contents of R0 are clearly equal to themselves, this results in all the bits in R0 being written to 0. As a consequence, the flags listed above are also assigned the values ZF, PF=1 and SF, OF, CF=0. But consider how this is done: the contents of R0, [R0], must be accessed and moved to the arithmetic logic unit (ALU), compared bit by bit with themselves, determined equal, resulting in a 0 being written back for each bit. This result of all 0s must then be examined to determine which flags need to be altered, upon which the appropriate changes are made to the flags register. As this is a common command, this highly redundant series of steps will be executed many times.

In contrast, the first aspect of the present invention avoids this redundancy. When an XOR command is received, and if its register operands are equal, the contents of that register are directly zeroed and the appropriate flags are also directly set or reset. Since the outcome of this operation is already known, this saves the steps of accessing, moving to the ALU, and comparing bit by bit the contents of the register, evaluating the result, and finally assigning values to the appropriate flags, thereby avoiding the execution steps of the prior art. When used in the preferred embodiment of a multiple pipeline microprocessor, the (XOR,=) command can then be placed in a pipeline with less than the full capabilities normally required.

FIG. 1 is a block diagram of a basic embodiment of the present invention. The (XOR,=) block 11 receives instructions as they are issued from an instruction buffer 10. If the instruction is an XOR with the same register for both of its operands, the "+" path is taken. The result is immediately implemented in the registers 12, assigning the flags appropriate values, and clearing the register which comprised the equal operands. It can then go back to the instruction fetch stage 15 and proceed with the next instruction. Otherwise, the "−" path is taken and the instruction is then passed on to the execution stage 13 and processed normally. Note that the (XOR,=) block 11 needs neither the various steps listed in the execution stage 13 nor access to the memory cache 14 should the operands be memory. Also note, as shown by the single direction arrow of the "+" path, that the (XOR,=) block only writes into the registers 12 and does not read out their contents.

The dashed box 17 contains the elements of a preferred embodiment of the present invention. Although this has been presented in the context of a microprocessor as its preferred embodiment, it should be noted that the invention can be implemented in a much more basic environment. The operands themselves need not themselves be registers. They could also be more than two by using a more general XOR, defined as logically equivalent to both ORing and NANDing the operands, followed by ANDing the pair of subsequent outputs. In addition, either of the two results, of assigning values to the flags and of zeroing the operands, can be implemented independently.

At this more minimal level, all that is required for the first of these alternate embodiments is a set of registers, including at minimum a flags register, and an instruction execution device of some form which accepts an XOR as a member of its instruction set. Once an XOR instruction is received and found to have all its operands equal, it would directly assign the selected set of flags to the predetermined values. For the second, only the operands are zeroed and even the flags register is no longer required. Instead, although the instruction execution device still does not need to read the contents of the operand, it now needs to be able to write back to this operand in, say, a register for the preferred embodiment or maybe memory in another embodiment. In this last case, this would improve the efficiency of a pair of dependent instructions, such as xor m1,m1; [M1] set to 0 move r1,m1; R1←[M1]

for a memory address M1, by directly zeroing [M1] before it is moved into the register R1. In any of these more general situations, since the outcome is known beforehand, it produces this result without actually executing the XOR instruction.

Figure 2:
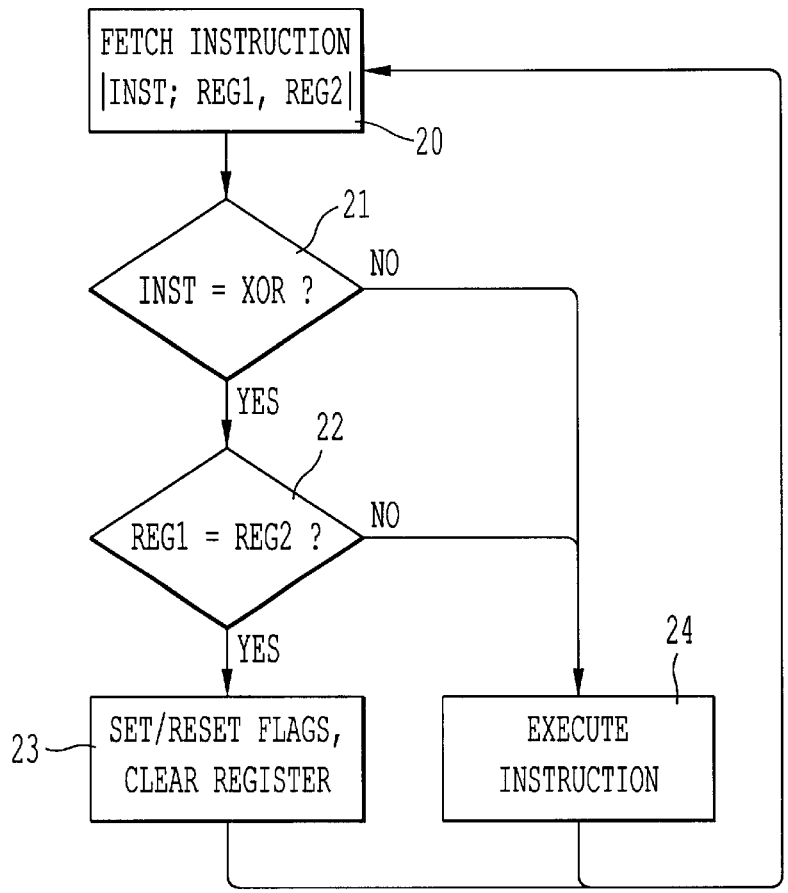
FIG. 2 is a flow chart illustrating a preferred operation of the present invention.

Returning to the preferred embodiment, FIG. 2 is a flow chart to illustrate the conceptual basis of the present invention with two registers for operands. Upon fetching an instruction in step 20, the processor will decide in step 21 whether the instruction is an XOR instruction. If so, it is passed to step 22 where the operands are compared. (In practice, both of these decisions, steps 21 and 22, can be made at the same time.) When these operands are equal, step 23 follows in which the prescribed flags are set/reset and the register which comprised both operands is zeroed. Should either step 21 or step 22 produce a negative result, the processor instead passes the instruction on to the execution stage of step 24, where the instruction is carried out in the usual manner. When step 23 or 24 is complete, the next instruction is fetched and the process repeated.

It is the left hand column on FIG. 2, consisting of steps 21–23, which is the present invention: note the dedicated XOR path which completely bypasses the execution step 24 when the operands are equated. This isolation of the XOR command distinguishes the present invention from the prior art.

To be more specific on this operation, consider the example of an instruction with two registers as operands. This will be represented symbolically as |INST:reg1, reg2| below: INST is the particular instruction issued, such as an ADD or XOR, and reg1 and reg2 are the operands of the instruction. In terms of operation code INST will be realized as a series of 0s and 1s. The (here 3 bit) binary label of each of the registers will be abc. Writing this symbolic representation above its realization in operation code produces the notation

|INST: reg1, reg2|

0s, 1s: $a_1 b_1 c_1 a_2 b_2 c_2$.

For specificity, when a particular realization of operation code is needed, Intel™X86 code is used. Appendix B of the book by Intel, *Intel Architecture Software Developer's Manual*, 1997 gives more detail.

The example of an XOR command is then the two byte instruction

|XOR: reg1, reg2|

001100rw;11$a_1 b_1 c_1 a_2 b_2 c_2$.

The r determines to which of the two registers the result is written, and is, therefore, irrelevant when they are equal. The w refers to the size of the register and may also take either value here. The two 1s after the semicolon, included to separate the command into bytes, indicate that the operands given to XOR command will be two registers.

Steps 21 and 22 of FIG. 2 then consist of making the comparison:

INST=XOR, reg1=reg2 ?

001100—;11abcabc ?

The second line is what the positive result looks like as a piece of operation code, with "−" indicating either value is acceptable in this example. Note again that only the label of the register, abc, is compared, not the contents, [abc].

(Some instruction sets, such as the Intel™ set referred to here, contain an XOR instruction where only one operand is specified, instead of the usual multi-operand structure. In these cases, a second operand, usually the accumulator, is actually implicit in the instruction code. For this reason, this case is also really a two operand XOR instruction: since the second, implicit operand is inherent in the code, the present invention also covers this case of a single (explicit) operand.)

If the instruction meets both of these conditions, the result would then be step 23, namely

ZF,PF→1

SF,OF,CF→0

[abc]→0 in the preferred embodiment, where again [abc] are the contents of the register corresponding to that binary label.

It should be noted that a more general assignment of flags could be executed in the same manner: exactly which flags are adjusted, what value they are given, and what is written back into the register are all things which can be chosen differently than above. These choices are the conventional outcome of an XOR command with equal operands. Other choices, where, say, the value of a particular flag is left unchanged or assigned differently, can easily be implemented in exactly the same way. However, as the programmer would need to keep these permutations in mind, this could cause programming confusion. So although a more general arrangement is easily conceivable, this more transparent assignment is the preferred embodiment.

Another aspect of the present invention is to perform the comparison using state machines or by microprogramming of the controller for the umicroprocessor. However, primary goal here is to both increase speed and decrease power consumption. Microprogramming might deprive the present invention of much of its advantage. For these reasons, the present invention is hardwired into the preferred embodiment.

Figure 3:
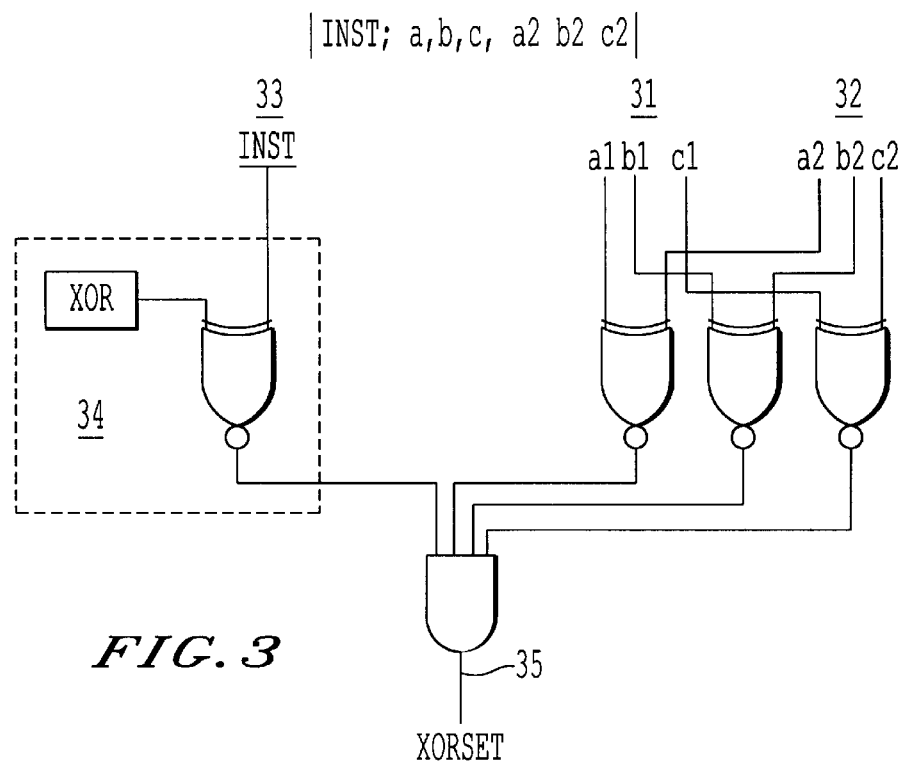
FIG. 3 is a simplified example of how a portion of the present invention may be implemented in terms of basic logic circuits.

FIG. 3 is one embodiment showing how the left column of the FIG. 2 flow chart, steps 21–22, may be hardwired into the microprocessor for the example given above with two registers as the operands. The input is the operation code containing the instruction INST 33 and the binary labels of the pair of registers 31 and 32. The registers are compared at the same time as the instruction is compared with that for XOR instructions 34, which are fixed in the circuit. If there is a match in both cases, a control signal XORSET 35 results and the appropriate values of 1 or 0 will go to the flags while the register is also zeroed. This is a straightforward way to achieve the necessary results for that part of the circuit which would be added to directly perform the flag assignment and register resets required. Note that the actual contents of the register are not consulted.

Figure 4A:
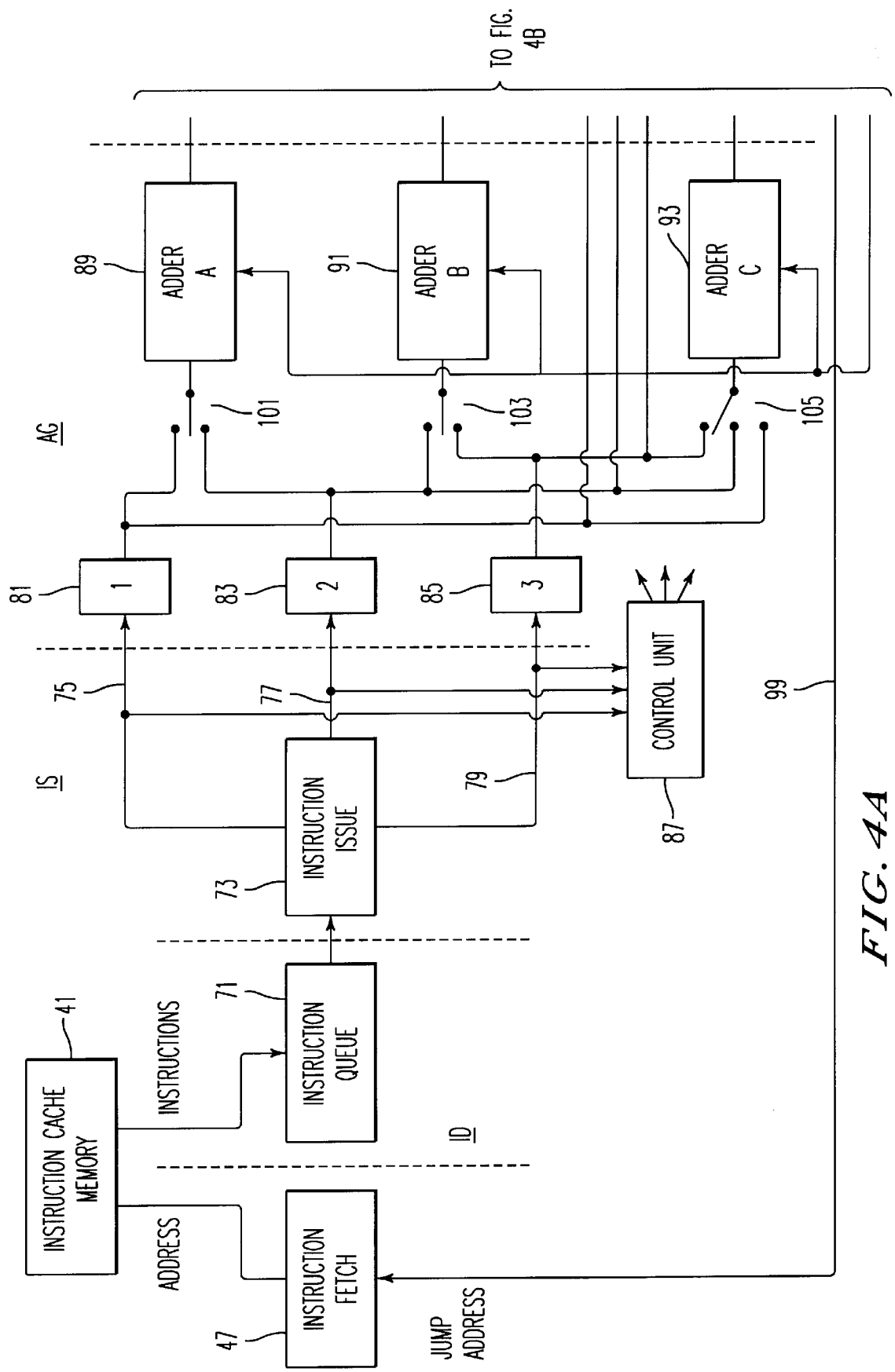
FIG. 4 is an incorporation of the present invention within a microprocessor of a multiple pipeline architecture.
Figure 4B:
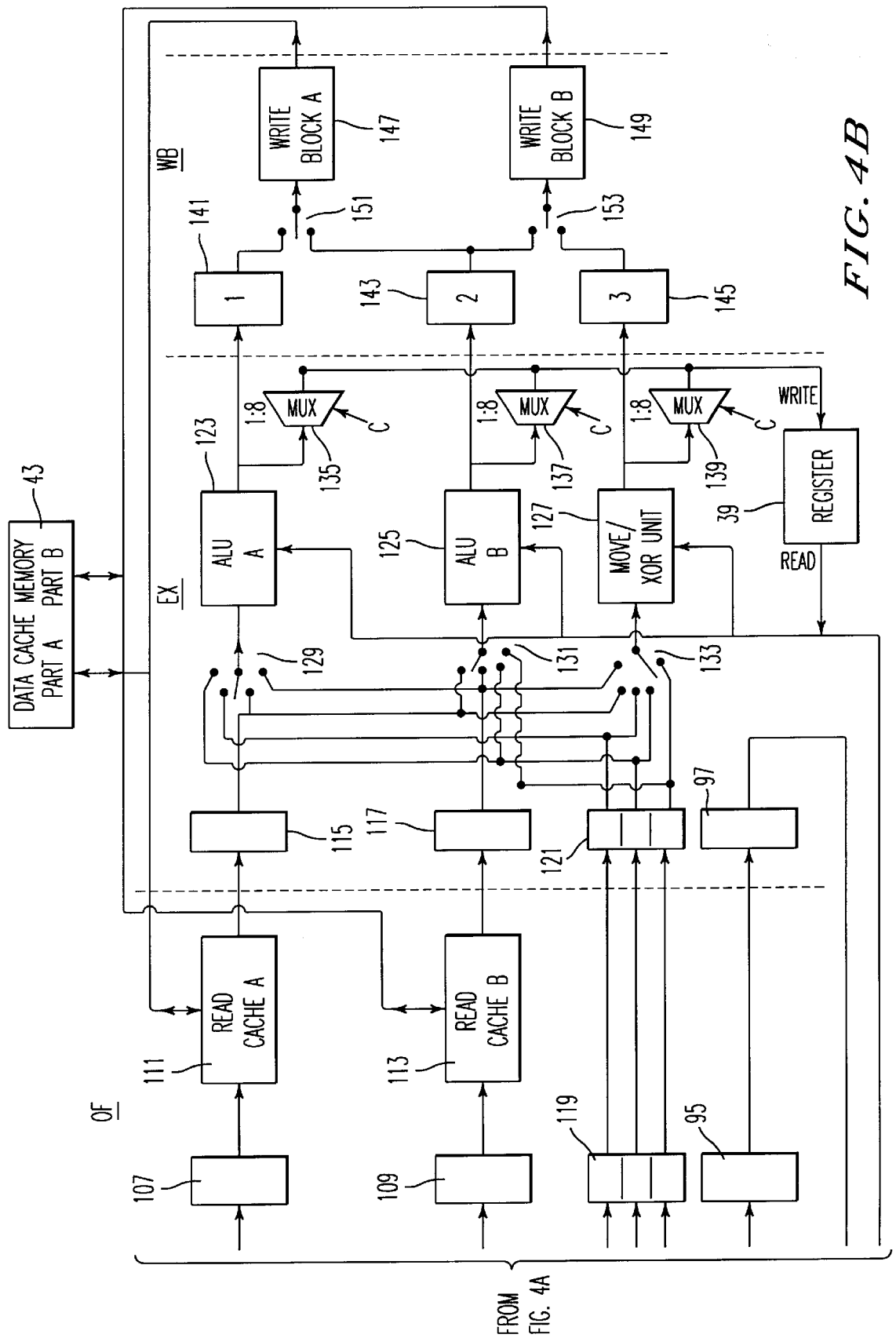

FIG. 4 shows another aspect of the present invention by placing it within the context of a microprocessor. In this particular embodiment it is shown in a multiple pipeline architecture, specifically in a three pipeline example where one of the pipelines has a reduced ALU. First a description of FIG. 4 is given, followed by an explanation of how the invention is incorporated within this architecture. For a more detailed discussion of the operation of FIG. 4, see U.S. patent application "Dynamic Allocation of Resources in Multiple Microprocessor Pipelines," Munson, Ser. No. 09/062,804, filed Apr. 20, 1998, that is hereby incorporated herein by this reference. FIG. 4 of the current application is a modified version of FIG. 2 found there.

In the preferred embodiment as shown in FIG. 4, a standard pipeline consists of the stages Instruction Decode (ID), instruction ISsue (IS), Address Generation (AG), Operand Fetch (OF), EXecution (EX), and finally Write Back (WB). These stages are traversed by three separate pipelines which pass through either ALU A 123, ALU B 125, or the move/XOR unit 127. When an instruction arrives from the instruction queue 71, the instruction issue unit 73 sends it to one of the three latches 81, 83, or 85. The instruction issue unit 73 and control unit 87 determine which latch it is sent to and, by way of the two sets of switches (101, 103, 105) and (115, 117, 121), which pipeline it takes. This depends upon what the instruction is, and whether it requires a full ALU. Finally, after passing through either a full ALU or the move/XOR unit, the results are written back to the registers 39 or data cache 43 as needed.

When the instruction issue unit 73 receives an (XOR,=) signal, it is directed down the third pipeline, passing through latches 119 and 121 and into the move/XOR unit 127. In this embodiment, the present invention resides in the move/XOR unit 127, where a circuit such as that in FIG. 3 executes the (XOR,=), in conjunction with the instruction issue stage, that must recognize the command as an (XOR,=). This serves several purposes: it leaves the full ALUs 123 and 125 free for instructions which may require them, reduces power consumption by both using a less than full sized ALU and avoiding the adders and cache readers, and increases speed for the execution of the (XOR,=) commands.

This embodiment also allows an (XOR,=) instruction to be paired with following dependent instructions more efficiently. Consider again the pair of instructions xor r0,r0 add r0,r1.

The ADD instruction depends on the outcome of the XOR instruction. By simply zeroing the dependent input of this following instruction, a pair such as this may be issued simultaneously. The (XOR,=) instruction proceeds down the third pipeline incorporating the invention, while the dependent instruction may simultaneously move down another pipeline without getting stalled while it waits for the (XOR,=) to be completed.

The utility of the present invention is increased by this inclusion of the XOR command in a reduced capacity ALU, or in the extreme case no ALU, pipeline. For the preferred embodiment it is combined into the dedicated move/XOR unit 127 that can access the registers for move instructions even though this capability is not needed for the (XOR,=) instruction. Were FIG. 4 reduced to the more common two pipeline architecture by eliminating the third, simpler pipeline, the invention could still be incorporated into ALU A 123 or ALU B 125. But then this would pass the XOR command through the adder of the address generation stage (89 or 91) and the cache reading of the operand fetch stage (111 or 113), undermining much of the utility of the present invention. Having three, or more, pipelines makes the dedication of one pipeline in this way a more practical architecture. Even though it is less effective there, the preferred embodiment still includes the invention in one or both of the full ALUs in case a second or third (XOR,=) instruction is issued together with the first. It also improves the combination of (XOR,=) instructions with following dependent instructions as in the move/XOR unit, but for a larger number of dependent instructions.

The latches 119 and 121 are required in the embodiment of FIG. 4 to prevent the instructions of the third, simpler pipeline from racing ahead of those in the other pipelines. Such racing can lead to data hazards and other problems which occur when an instruction in one pipeline passes that in another pipeline upon which it is dependent. The use of these latches prevents the invention from fully exploiting its increase in speed. In another embodiment of the present invention, the microprocessor would make allowances for handling this possibility by having the capability for instructions being executed out of order. Within an architecture allowing out of order execution, latches corresponding to 85, 119, and 121 are absent. The (XOR,=) can proceed immediately to conclusion without pausing at these intermediate latches. In this way, the increase in speed and power consumption due to the present invention would be even greater.

It is to be understood that while the invention has been described above in conjunction with preferred specific embodiments, the description and examples are intended to illustrate and not limit the scope of the invention, which is defined by the scope of the appended claims.

It is claimed:

1. A method of executing a current instruction from a sequence of instructions in an instruction execution device, said sequence of instructions comprising at least one type of XOR instruction, said current instruction comprising an operation code and at least two operands, the method comprising the steps of:

testing whether the operation code of the current instruction belongs to one type of XOR instruction;

comparing whether the at least two operands of the current instruction are the same; and setting each of the at least two operands to the value of zero when the operation code of the current instruction belongs to one type of XOR instruction and the at least two operands of the current instruction are the same, without performing an XOR operation of the at least two operands.

2. The method according to claim 1, wherein each of said at least two operands of the current instruction identifies a register by a label, each of said labels comprising a series of bits, each bit having either value 1 or value 0, are compared on an individual bit basis to determine whether they are the same.

3. The method according to claim 1, wherein the number of operands of the current instruction is two.

4. The method according claim 1, wherein said operation code testing step and said operand comparing step are performed at substantially the same time.

5. A method of executing a current instruction from a sequence of instructions in an instruction execution device, said instruction execution device comprising at least one register including a flags register, said flags register comprising one or more flags, and said sequence of instructions comprising at least one type of XOR instruction, said current instruction comprising an operation code and at least two operands, the method comprising the steps of:

testing whether the operation code of the current instruction belongs to one type of XOR instruction;

comparing whether the at least two operands of the current instruction are the same; and assigning predetermined values to at least one of said one or more flags when the operation code of the current instruction belongs to one type of XOR instruction and the at least two operands of the current instruction are the same, without performing an XOR operation of the at least two operands.

6. The method according to claim 5, wherein the instruction execution device comprises a plurality of registers including said flags register and each of said at least two operands of the current instruction identifies a register by a label.

7. The method according to claim 6, wherein each of said at least two operands of the current instruction identifies register by a label, each of said labels comprising a series of bits, each bit having either value 1 or value 0, are compared on an individual bit basis to determine whether they are the same.

8. The method according to claim 6, further comprising setting each of the registers identified by each of the at least two operands to the value of zero when the operation code of the current instruction belongs to one type of XOR instruction and the at least two operands of the current instruction are the same.

9. The method according to claim 5 or claim 8, wherein the number of operands of the current instruction is two.

10. The method according to claim 5 or claim 8, wherein said operation code testing step and said operand comparing step are performed at substantially the same time.

11. The method according to claim 5 or claim 8, wherein assigning said predetermined values to at least one of said one or more flags comprises:

assigning a value 1 for the zero flag and parity flag; and assigning a value 0 for the sign flag, the overflow flag and the carry flag.

12. An instruction execution device for processing a current instruction from a sequence of instructions, said sequence of instructions comprising at least one type of XOR instruction, said current instruction comprising an operation code and at least two operands, and said instruction execution device comprising:

an XOR checker for receiving said current instruction, said XOR checker determining whether the operation code of said current instruction belongs to one type of XOR instruction;

an operand comparator for receiving said at least two operands of said current instruction, said operand comparator testing whether said at least two operands of said current instruction are the same; and a result generator, coupling with said XOR checker and operand comparator, wherein said result generator operates to assign the value of zero to each of the at least two operands when the operation code of the current instruction belongs to the at least one type of XOR instructions and the at least two operands of the current instruction are the same, without performing an XOR operation of the at least two operands.

13. The device of claim 12, wherein each of said at least two operands of the current instruction identifies a register by a label, each of said labels comprising a series of bits, each bit having either value 1 or value 0, are compared on an individual bit basis to determine whether they are the same.

14. The device of claim 12, wherein the number of operands of the current instruction is two.

15. The device of claim 12, wherein the instruction execution device is a microprocessor.

16. The device of claim 15, wherein the microprocessor is comprised plurality of multi-staged pipelines.

17. The device of claim 16, wherein the pipeline executing said current instruction with equal operands contains an arithmetic logic unit having less capability than those arithmetic logic units in the other pipelines.

18. The device of claim 16, wherein the number of pipelines is at least three, one of said at least three pipelines containing an arithmetic logic unit having less capability than those in the other pipelines, said XOR instruction with equal operands being executed in that pipeline which contains said lesser capability arithmetic logic unit.

19. An instruction execution device for processing a current instruction from a sequence of instructions, said sequence of instructions comprising at least one type of XOR instruction, said current instruction comprising an operation code and at least two operands, and said instruction execution device comprising:
   at least one register, including a flags register, said flags register comprising one or more flags;
   an XOR checker for receiving said current instruction, said XOR checker determining whether the operation code of said current instruction belongs to one type of XOR instruction;
   an operand comparator for receiving said at least two operands of said current instruction, said operand comparator testing whether said at least two operands of said current instruction are the same; and
   a result generator, coupling with said XOR checker and operand comparator, wherein said result generator operates to assign predetermined values to at least one of said one or more flags in said flags register when the operation code of the current instruction belongs to the at least one type of XOR instructions and the at least two operands of the current instruction are the same, without performing an XOR operation of the at least two operands.

20. The device of claim 19, wherein the instruction execution device comprises a plurality of registers including said flags register and each of said at least two operands of the current instruction identifies a register by a label.

21. The device of claim 20, wherein each of said at least two operands of the current instruction identifies a register by a label, each of said labels comprising a series of bits, each bit having either value 1 or value 0, are compared on an individual bit basis to determine whether they are the same.

22. The device of claim 20, wherein when the operation code of the current instruction belongs to one type of XOR instruction and the at least two operands of the current instruction are the same, the register identified by each of the at least two operands is set to the value of zero.

23. The device of claim 19 or claim 22, wherein the number of operands of the current instruction is two.

24. The device of claim 19 or claim 22, wherein the result generator operates to assign said predetermined values to one or more of said at least one flag comprising:
   a value 1 for the zero flag and parity flag; and
   a value 0 for the sign flag the overflow flag and the carry flag.

25. The device of claim 19 or claim 22, wherein the instruction execution device is a microprocessor.

26. The device of claim 25, wherein the microprocessor is comprised plurality of multi-staged pipelines.

27. The device of claim 26, wherein the pipeline executing said current instruction with equal operands contains an arithmetic logic unit having less capability than those arithmetic logic units in the other pipelines.

28. The device of claim 26, wherein the number of pipelines is at least three, one of said at least three pipelines containing an arithmetic logic unit having less capability than those in the other pipelines, said XOR instruction with equal operands being executed in that pipeline which contains said lesser capability arithmetic logic unit.

29. A microprocessor, for processing a current instruction from a sequence of instructions, said sequence of instructions comprising at least one type of XOR instruction, each of said at least one type of XOR instruction comprising an operation code and at least two operands, and said instruction execution device comprising:
   an XOR checker for receiving said current instruction, said XOR checker determining by use of a plurality of logic gates whether the operation code of said current instruction belongs to one type of XOR instruction;
   an operand comparator for receiving said at least two operands of said current instruction, said operand comparator testing by use of a plurality of logic gates to determine whether said at least two operands of the current instruction are the same; and
   a result generator, coupling with said XOR checker and operand comparator, wherein said result generator operates to assign the value of zero to each of the at least two operands when the operation code of the current instruction belongs to the at least one type of XOR instruction and the at least two operands of the current instruction are the same by use of a plurality of logic gates, without performing an XOR operation.

30. The microprocessor of claim 29, wherein each of said at least two operands of the current instruction identifies a register by a label, each of said labels comprising a series of bits, each bit having either value 1 or value 0, are compared on an individual bit basis to determine whether they are the same.

31. The microprocessor of claim 29, wherein the number of operands of the current instruction is two.

32. The microprocessor of claim 29, additionally comprising a plurality of multi-staged pipelines.

33. The microprocessor of claim 32, wherein the pipeline executing said current instruction with equal operands contains an arithmetic logic unit having less capability than those arithmetic logic units in the other pipelines.

34. The microprocessor of claim 32, wherein the number of pipelines is at least three, one of said at least three pipelines containing an arithmetic logic unit having less capability than those in the other pipelines, said current instruction with equal operands being executed in that pipeline which contains said lesser capability arithmetic logic unit.

35. A microprocessor, for processing a current instruction from a sequence of instructions, said sequence of instructions comprising at least one type of XOR instruction, each of said at least one type of XOR instruction comprising an operation code and at least two operands, and said instruction execution device comprising:
   at least one register, including a flags register, said flags register comprising one or more flags;
   an XOR checker for receiving said current instruction, said XOR checker determining by use of a plurality of logic gates whether the operation code of said current instruction belongs to one type of XOR instruction;
   an operand comparator for receiving said at least two operands of said current instruction, said operand comparator testing by use of a plurality of logic gates to determine whether said at least two operands of the current instruction are the same; and
   a result generator, coupling with said XOR checker and operand comparator, wherein said result generator operates to assign predetermined values to at least one of said one or more flags in said flags register when the operation code of the current instruction belongs to the at least one type of XOR instruction and the at least two operands of the current instruction are the same by use of a plurality of logic gates, without performing an XOR operation.

36. The microprocessor of claim 35, wherein the instruction execution device comprises a plurality of registers including said flags register and each of said at least two operands of the current instruction identifies a register by a label.

37. The microprocessor of claim 36, wherein each of said at least two operands of the current instruction identifies a register by a label, each of said labels comprising a series of bits, each bit having either value 1 or value 0, are compared on an individual bit basis to determine whether they are the same.

38. The microprocessor of claim 36, wherein when the operation code of the current instruction belongs to one type of XOR instruction and the at least two operands of the current instruction are the same, the register identified by each of the at least two operands is set to the value of zero.

39. The microprocessor of claim 35 or 38, wherein the number of operands of the current instruction is two.

40. The microprocessor of claim 35 or claim 38, wherein the result generator operates to assign said predetermined values to one or more of said at least one flag comprising:
a value 1 for the zero flag and parity flag; and
a value 0 for the sign flag, the overflow flag and the carry flag.

41. The microprocessor of claim 35 or 38, additionally comprising a plurality of multi-staged pipelines.

42. The microprocessor of claim 41, wherein the pipeline executing said current instruction with equal operands contains an arithmetic logic unit having less capability than those arithmetic logic units in the other pipelines.

43. The microprocessor of claim 41, wherein the number of pipelines is at least three, one of said at least three pipelines containing an arithmetic logic unit having less capability than those in the other pipelines, said current instruction with equal operands being executed in that pipeline which contains said lesser capability arithmetic logic unit.

44. A method of executing a plurality of current instructions from a sequence of instructions in an instruction execution device, said sequence of instructions comprising at least one type of XOR instruction, said plurality of current instructions comprising a first current instruction and one or more subsequent current instructions, said first current instruction comprising an operation code and at least two operands, said subsequent current instruction having one or more operands dependent on the result of said first current instruction, the method comprising the steps of:
testing whether the operation code of the first current instruction belongs to one type of XOR instruction;
comparing whether the at least two operands of the first current instruction are the same; and
setting each of the one or more operands of said subsequent current instructions which are dependent on the result of said first current instruction to the value of zero when the operation code of the first current instruction belongs to one type of XOR instruction and the at least two operands of the first current instruction are the same, without performing an XOR operation of the at least two operands of the first current instruction.

45. The method according to claim 44, wherein the number of operands of the first current instruction is two.

46. The method according to claim 44, wherein said operation code testing step and said operand comparing step are performed at substantially the same time.

47. An instruction execution device for processing a plurality of current instructions from a sequence of instructions, said sequence of instructions comprising at least one type of XOR instruction, said plurality of current instructions comprising a first current instruction and one or more subsequent current instructions, said first current instruction comprising an operation code and at least two operands, said subsequent current instruction having one or more operands dependent on the result of said first current instruction, and said instruction execution device comprising:
an XOR checker for receiving said first current instruction, said XOR checker determining whether the operation code of said first current instruction belongs to one type of XOR instruction;
an operand comparator for receiving said at least two operands of said first current instruction, said operand comparator testing whether said at least two operands of said first current instruction are the same; and
a result generator, coupling with said XOR checker and operand comparator, wherein said result generator operates to assign the value of zero to each of the one or more operands of said subsequent current instructions which are dependent on the result of said first current instruction when the operation code of the first current instruction belongs to the at least one type of XOR instructions and the at least two operands of the first current instruction are the same, without performing an XOR operation of the at least two operands of the first current instruction.

48. The device of claim 47, wherein the number of operands of the first current instruction is two.

49. The device claim 47, wherein the instruction execution device is a microprocessor.

50. A method of executing a current instruction from a sequence of instructions in an instruction execution device, the sequence of instructions including at least one type of XOR instruction, the current instruction having an operation code and at least two operands, comprising:
categorizing the operation code of the current instruction as one of
the at least one type of XOR instruction, and
a different instruction;
comparing the at least two operands of the current instruction when the current instruction is categorized in the categorizing step as the at least one type of XOR instruction;
setting at least one of the at least two operands to a value of zero when the current instruction is categorized in the categorizing step as the at least one type of XOR instruction and it is determined in the comparing step that the at least two operands are the same; and
executing the current instruction when one of
the current instruction is categorized in the categorizing step as a different instruction, and
the two operands are determined to be different in the comparing step.

51. A method of executing a current instruction from a sequence of instructions in an instruction execution device having at least one register including a flags register having at least one flag, the sequence of instructions including at least one type of XOR instruction, and the current instruction having an operation code and at least two operands, comprising:
categorizing the operation code of the current instruction as one of the at least one type of XOR instruction, and a different instruction;

comparing the at least two operands of the current instruction when the current instruction is categorized in the categorizing step as the at least one type of XOR instruction;

assigning predetermined values to at least one of the at least one flag of the flags register when the current instruction is categorized in the categorizing step as the at least one type of XOR instruction and it is determined in the comparing step that the at least two operands are the same; and executing the current instruction when one of
  the current instruction is categorized in the categorizing step as a different instruction, and
  the two operands are determined to be different in the comparing step.

* * * * *